US006604006B2

(12) United States Patent
Zeilinger

(10) Patent No.: US 6,604,006 B2
(45) Date of Patent: Aug. 5, 2003

(54) CONTROL DEVICE IN A SYSTEM AND METHOD FOR MONITORING A CONTROLLER

(75) Inventor: Reinhold Zeilinger, Gutenstetten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/734,464

(22) Filed: Dec. 11, 2000

(65) Prior Publication Data

US 2001/0050543 A1 Dec. 13, 2001

Related U.S. Application Data

(63) Continuation of application No. PCT/DE99/01695, filed on Jun. 10, 1999.

(30) Foreign Application Priority Data

Jun. 10, 1998 (DE) ......................................... 198 25 974

(51) Int. Cl.[7] ................................................ G05B 9/02
(52) U.S. Cl. .................................................... 700/79
(58) Field of Search .......................... 700/82, 79, 21, 700/22, 4, 245, 292, 293; 701/76, 107

(56) References Cited

U.S. PATENT DOCUMENTS

| | | | | |
|---|---|---|---|---|
| 3,915,747 A | * | 10/1975 | Summers et al. .............. 429/23 |
| 4,198,678 A | * | 4/1980 | Maatje et al. ................... 700/4 |
| 4,521,871 A | | 6/1985 | Galdun et al. ................. 714/11 |
| 4,642,753 A | * | 2/1987 | Easthill ........................ 700/79 |
| 4,745,542 A | * | 5/1988 | Baba et al. ............. 303/122.04 |
| 4,747,041 A | * | 5/1988 | Engel et al. .................... 307/29 |
| 4,958,270 A | * | 9/1990 | McLaughlin et al. .......... 700/82 |
| 4,962,462 A | * | 10/1990 | Fekete, deceased ........ 180/65.8 |
| 4,972,290 A | * | 11/1990 | Sun et al. ....................... 361/64 |
| 5,001,641 A | * | 3/1991 | Makino ....................... 180/197 |
| 5,074,626 A | * | 12/1991 | Kramer et al. .......... 303/122.04 |
| 5,107,425 A | | 4/1992 | Donges et al. ................. 701/33 |
| 5,136,511 A | * | 8/1992 | Pannbacker .................. 303/187 |
| 5,193,887 A | * | 3/1993 | Bleckmann et al. .... 188/181 C |
| 5,233,538 A | * | 8/1993 | Wallis ......................... 700/286 |
| 5,247,454 A | * | 9/1993 | Farrington et al. .......... 700/293 |
| 5,265,944 A | * | 11/1993 | Gloceri ................... 303/122.07 |
| 5,394,852 A | * | 3/1995 | McAlister .................... 123/435 |
| 5,406,485 A | * | 4/1995 | Wise et al. ............. 303/122.05 |
| 5,490,072 A | * | 2/1996 | Hornback ..................... 700/79 |
| 5,511,223 A | * | 4/1996 | Scecina et al. .............. 376/215 |
| 5,631,532 A | * | 5/1997 | Azuma et al. ............... 320/102 |
| 5,677,073 A | * | 10/1997 | Kawatsu ...................... 204/265 |
| 5,684,702 A | * | 11/1997 | Phillips et al. .......... 303/122.11 |
| 5,784,547 A | * | 7/1998 | Dittmar et al. ................. 714/4 |
| 5,862,502 A | * | 1/1999 | Giers .......................... 303/122 |
| 5,941,966 A | * | 8/1999 | Gotze et al. ................. 710/100 |
| 5,955,859 A | * | 9/1999 | Baurand et al. ............. 318/558 |
| 6,002,970 A | * | 12/1999 | Abdelnour et al. ............ 700/82 |
| 6,061,601 A | * | 5/2000 | Jansen et al. ................... 700/2 |
| 6,122,713 A | * | 9/2000 | Huang et al. ................ 711/147 |
| 6,201,997 B1 | * | 3/2001 | Giers .......................... 700/111 |
| 6,243,629 B1 | * | 6/2001 | Sugimoto et al. ....... 303/122.05 |

FOREIGN PATENT DOCUMENTS

| | | |
|---|---|---|
| DE | 32 34 637 C2 | 3/1984 |
| DE | 37 18 582 A1 | 12/1987 |
| DE | 41 34 396 A1 | 5/1992 |
| DE | 43 41 082 A1 | 6/1995 |
| DE | 195 29 213 A1 | 3/1996 |
| EP | 0 460 308 A1 | 12/1991 |
| FR | 2 561 410 A1 | 9/1985 |
| JP | 09 092 318 | 4/1997 |

\* cited by examiner

Primary Examiner—John Follansbee
Assistant Examiner—Edward F. Gain, Jr.
(74) Attorney, Agent, or Firm—Laurence A. Greenberg; Werner H. Stemer; Ralph E. Locher

(57) ABSTRACT

A control device is provided for a machine, system or appliance, particularly a fuel cell system, having a first control unit and a second control unit which interchanges signals with the first control unit and monitors the first control unit. A comparison module compares states of the control units. A method for monitoring a controller includes monitoring the first control unit with the second control unit by comparing the states of the control units.

12 Claims, 4 Drawing Sheets

CONTROL DEVICE IN A SYSTEM AND METHOD FOR MONITORING A CONTROLLER

CROSS-REFERENCE TO RELATED APPLICATION

This application is a continuation of copending International Application No. PCT/DE99/01695, filed Jun. 10, 1999, which designated the United States.

BACKGROUND OF THE INVENTION

1. Field of the Invention

The invention relates to a control device in a system having first and second control units. The invention also relates to a method for monitoring a controller.

Safety-related controllers (e.g. programmable logic controllers such as Simatic S5-95F) are known in the prior art, but they have only a limited scope of functions and a low processing power. That means that when processing extensive automation tasks, a number of controllers have to be used in order to meet particular safety requirements which are imposed (e.g. requirement class AK3 based on DIN V 19250).

2. Summary of the Invention

It is accordingly an object of the invention to provide a control device in a system and a method for monitoring a controller, which overcome the hereinafore-mentioned disadvantages of the heretofore-known devices and methods of this general type and which meet higher safety requirements (e.g. AK3 based on DIN V 19250) economically.

With the foregoing and other objects in view there is provided, in accordance with the invention, in a system having a first control unit and a second control unit for interchanging signals with the first control unit and for monitoring the first control unit, a control device, comprising a comparison module for comparing states of the control units; and a first disconnection component for interchanging signals with the comparison module and for disconnecting the system or machine upon an absence of a trigger pulse from one of the control units.

In the case of the control device according to the invention, the first control unit is complemented by a further, second control unit which monitors the first control unit, permitting the safety requirements of requirement class 3 (AK3) to be met overall without the need to qualify the control device and the peripheral elements in accordance with DIN V 19250.

The first control unit is, by way of example, a module and system controller, particularly for a fuel cell system, which controls the fuel cell system and sequences in a fuel cell module in the fuel cell system. The actual regulation, control and monitoring of the automated process, for example in the fuel cell system, are performed by the first control unit.

The second control unit is provided in order to monitor the first control unit. The two control units advantageously receive identical input signals from the peripheral elements in the system. The second control unit then monitors the processing of the input signals by the first control unit by way of the second control unit processing the input signals in an identical manner.

The respective output signals for the peripheral elements are subsequently ascertained both in the first control unit and in the second control unit in parallel using algorithms for control, regulation and monitoring.

However, these output signals are advantageously sent to the peripheral elements by the first control unit only.

After the output signals have been ascertained, the first control unit advantageously sends up-to-date state information to the second control unit and, if the second control unit is simultaneously being monitored by the first control unit, it also receives the up-to-date state information for the second control unit.

A comparison module which is located in the first control unit, for example, then compares the states of the two control units. It is advantageous if there is such a comparison module in each control unit. If an identity of states is then established during the state comparison, a disconnection component is triggered. When the disconnection component is triggered, it does not disconnect, so that the sequence functions of the controller are maintained.

If the state information items are found to differ from one another after a parameterizable synchronization time, then there is a fault. The comparison module, which interchanges signals with the disconnection component, that is to say is connected to the disconnection component directly or through further modules, then sends no trigger signal to the disconnection component or components. As a result of this, the disconnection component disconnects the system. This is done, for example, by virtue of the disconnection component interrupting the power supply for the controller, and therefore the controller per se, and/or the power supply for elements in the system.

In a fuel cell system, for example, all of the actuators in a zero-current state enter a secure state: hydrogen valves close, pumps switch off and modules in the control device also return to their original configuration as a result of a "reset".

After the output signals have been ascertained in the first and second control units, the state comparison in the first control unit and/or in the second control unit may, if appropriate, also be carried out as frequently as is necessary after individual processing steps.

According to one advantageous embodiment of the invention, the first control unit receives a trigger signal for the disconnection component or components from the second control unit if the second control unit has established identity during the state comparison.

This received trigger signal is forwarded by the first control unit if the state comparison in the first control unit has also produced an identity. The reciprocal monitoring of the two control units in the current monitoring cycle is then terminated and a trigger signal may be sent to the disconnection component or components in order to maintain the control functions further.

The monitoring component may be triggered through digital outputs of a CAN module.

The first and the second control units are advantageously connected to one another and to further elements of the controller through the use of a fieldbus, particularly a CAN bus (Control Area Network bus).

Expediently, the control device has a second disconnection component. Such dual safeguarding ensures that, even if the first disconnection component is faulty, the power supply is interrupted in the absence of triggering, for example.

Advantageously, the first, and if present the second, disconnection component contain a speed controller. A speed controller is particularly inexpensive and is very suitable as a disconnection component.

There is advantageously at least one bus module, particularly a CAN module, which is disposed between the first and/or second control unit and a disconnection component. Such a module converts the trigger pulse from the control unit into a pulse which is suitable for the disconnection component, for example a positive edge. This means that it is not necessary to place the disconnection component directly on the fieldbus, which would entail considerable effort.

With the objects of the invention in view, there is also provided a method for monitoring a controller, which comprises processing input signals from peripheral elements identically in first and second control units; ascertaining output signals in parallel for the peripheral elements, in the first and second control units; comparing states of the first control unit and states of the second control unit; sending a trigger signal to a disconnection component only upon identity between the states; and maintaining sequence functions of the controller only if the disconnection component is triggered regularly.

In the inventive method for monitoring a controller, a further, second control unit is used to monitor the first control unit by comparing the states of the control units.

Advantageously, the two control units monitor each other. This redundancy means that the controller is monitored with greater security, because a fault in the second control unit is also identified. When a fieldbus, particularly a CAN bus, is used, CAN modules are advantageously monitored cyclically. In this case, a control unit cyclically requests an output signal, a "sign of life", from the CAN modules. When this output signal arrives, the data bus operating system sends a message to the control program and one or more monitoring components are then triggered, which maintains the control function.

This trigger signal for the monitoring component is transmitted to the monitoring component from the data bus operating system, for example to the CAN data bus driver, through a CAN data bus connection, the CAN data bus and possibly a digital output module, if all of the elements of the aforementioned transmission chain are intact.

In a further fault situation, the transmitters and sensors of the peripheral elements may feed erroneous measured values into the control sequence due to an inadequate voltage supply. In order to prevent this, the method according to the invention advantageously also monitors the voltage of the power supply. If the voltage falls below a voltage limit value, the monitoring components are not triggered and/or a control unit stops operating.

Other features which are considered as characteristic for the invention are set forth in the appended claims.

Although the invention is illustrated and described herein as embodied in a control device in a system and a method for monitoring a controller, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
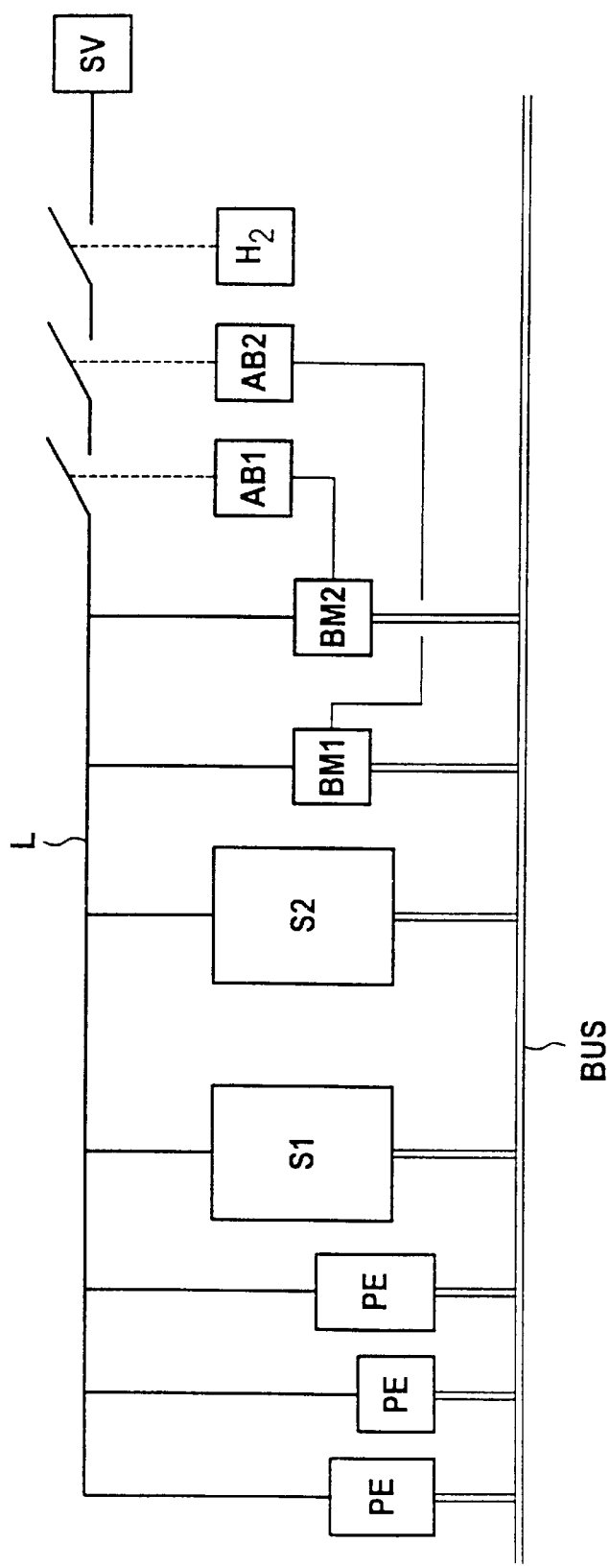
FIG. 1 is a block diagram illustrating elements of a control device.

Referring now to the figures of the drawings in detail and first, particularly, to FIG. 1 thereof, there is seen a first control unit S1, namely a module and system controller and a second control unit S2, namely a monitoring controller.

The first control unit S1 includes a non-illustrated central unit (inter alia power supply, CPU, bulk memory block, analog output block e.g. for prescribing a nominal speed value, and possibly a data bus connection), a control program, a system program, peripheral circuits (inter alia cell voltage measurement modules, analog input modules, temperature recording modules, digital input and output modules, all of the modules possibly in the form of data bus modules) and possibly a data bus (CAN bus) and a data bus driver (CAN bus driver).

The two control units S1, S2 are connected to one another through the use of a fieldbus which is in the form of a CAN data bus system, or CAN bus for short. The CAN bus, which is denoted by reference symbol BUS in FIG. 1, additionally connects two bus modules BM1, BM2, which are in the form of CAN modules, and a few peripheral elements PE (e.g. measured value transmitters, sensors, drives, servomotors) to the control units S1, S2. The bus modules BM1, BM2 are connected through signal lines to disconnection components AB1, AB2.

The elements of the control device, namely the control units S1, S2, the bus modules BM1, BM2 and the disconnection components AB1, AB2, as well as the peripheral elements PE, which are not part of the control device, are connected through a line L to a power supply SV. The line L can be interrupted by the disconnection components AB1, AB2, as well as by a hydrogen sensor $H_2$. The hydrogen sensor $H_2$ relates in particular to a control device for a hydrogen-operated system, for example a fuel cell system. In the event of a fault, e.g. if hydrogen escapes, the hydrogen sensor $H_2$ is likewise able to interrupt the power supply.

The first control unit S1 and the second control unit S2 monitor each other. The states of the control units S1, S2 are interchanged and compared both in the first control unit S1 and in the second control unit S2 at adjustable time intervals for the purpose of reciprocal monitoring. If an identity of states is established after an adjustable synchronization time has elapsed, a trigger pulse is sent to each of the bus modules BM1, BM2. The bus modules BM1, BM2 send the trigger pulse to the two disconnection components AB1, AB2 in modified form, for example in the form of a positive edge. The disconnection components AB1, AB2, in the form of speed controllers, check the regular arrival of the trigger pulses. If the trigger pulses arrive regularly (that is to say the "speed" is correct), the power supply is not interrupted by the disconnection components AB1, AB2.

It is only if a discrepancy is established during a state comparison, that the trigger pulses are not sent. As a result, the power supply is disconnected and the controller is stopped, for example.

Figure 2:
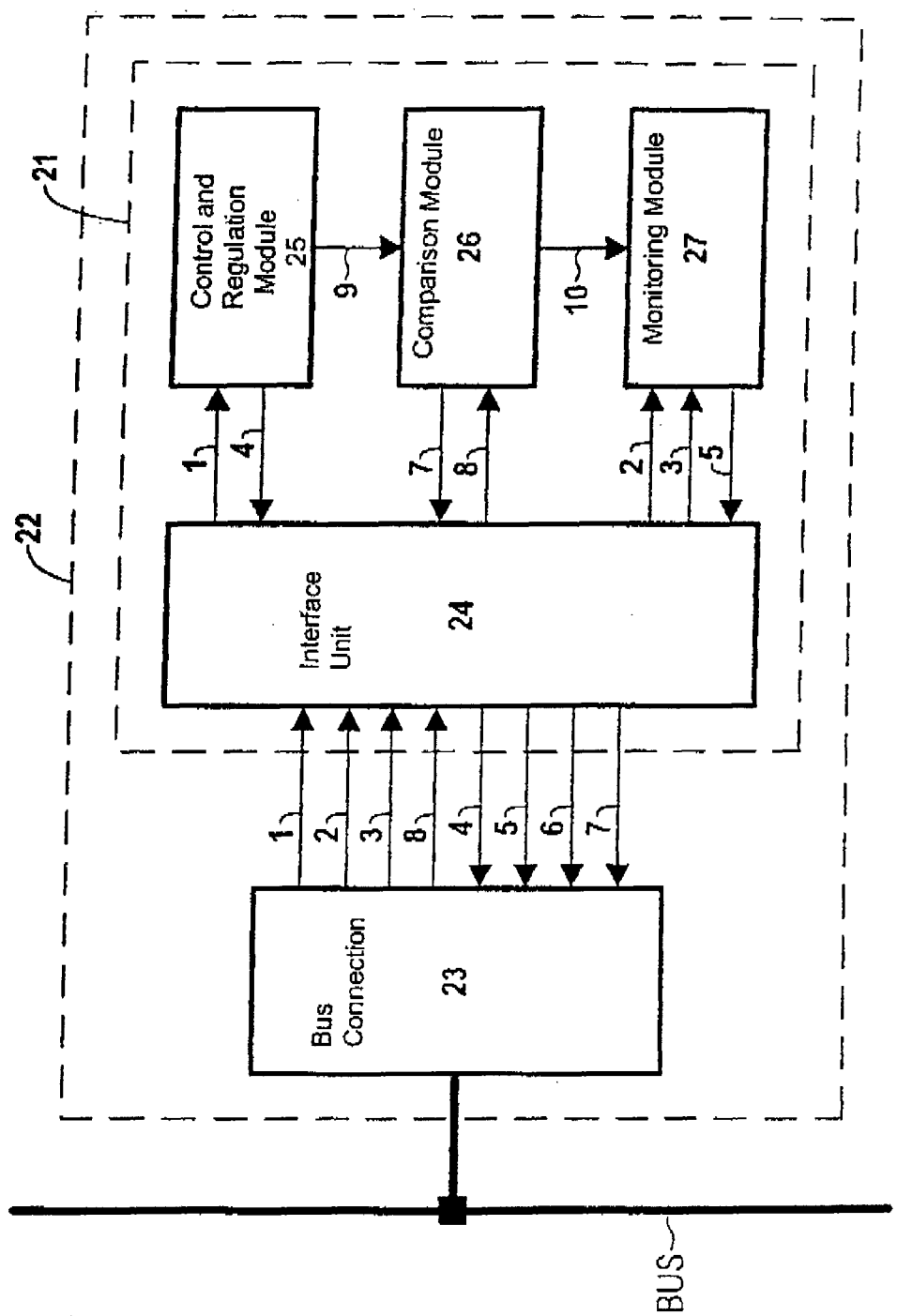
FIG. 2 is a block diagram of a control unit.

FIG. 2 shows a control unit 22 which includes a control module 21 and a bus connection 23. The control module 21, for its part, includes an interface unit 24, a control and regulation module 25, a comparison module 26 and a monitoring module 27. The control unit 22 is a first control unit and is connected to a second control unit through the use of a fieldbus BUS for the purpose of signal interchange.

Initially, the bus connection 23 is used to forward process input signals 1, which have been transmitted to the bus connection 23 by peripheral elements through the fieldbus BUS, through the interface unit 24 to the control and regulation module 25. The control and regulation module 25 is used to control process-related sequences in a system or machine. The control and regulation module 25 processes the process input signals 1 and sends process output signals 4 to the interface unit 24. From there, the process output signals 4 are forwarded through the bus connection 23 and through the use of the fieldbus BUS to the peripheral elements. If a critical state occurs on one of the peripheral units, an alarm signal 9 is sent to the comparison module 26 by the control and regulation module 25.

The comparison module 26 receives the alarm signal 9 from the control and regulation module 25 and sends a stop signal 10 to the monitoring module 27, which stops the triggering of the disconnection components. Therefore, the power supply for the system is interrupted.

The comparison module 26 also receives external state signals 8 for the second control unit. After processing, the comparison module 26 sends its own state signals 7 to the second control unit through the interface unit 24 and the bus connection 23.

The two comparison modules 26 in the first and second control units are connected and interchange signals whenever there is a state change. Those signals are compared with the present state of the respective control unit. If a discrepancy is established between the states after a parameterizable synchronization time, the respective comparison module 26 ends the activity of the monitoring module 27 using the stop signal 10.

The interface unit 24 sends report requests 6 to the bus modules cyclically in order to monitor the fieldbus and the bus modules. The bus modules have to report back within a monitoring time so that an output signal 2 from the bus modules, a "sign of life", is supplied to the monitoring unit 27.

In order for the monitoring module 27 to output a trigger pulse for a disconnection component, three conditions need to be satisfied: there must be a "sign of life" output signal 2 from each bus module; the states of the two controllers must be the same; and a trigger pulse 3 from the second control unit must have arrived at the monitoring module 27. If the conditions are satisfied, the monitoring module 27 outputs a trigger pulse 5 which is sent to a disconnection component through the interface unit 24, the bus connection 23, the fieldbus BUS and a bus module. The trigger pulse behind the bus module is a positive edge signal.

Figure 3:
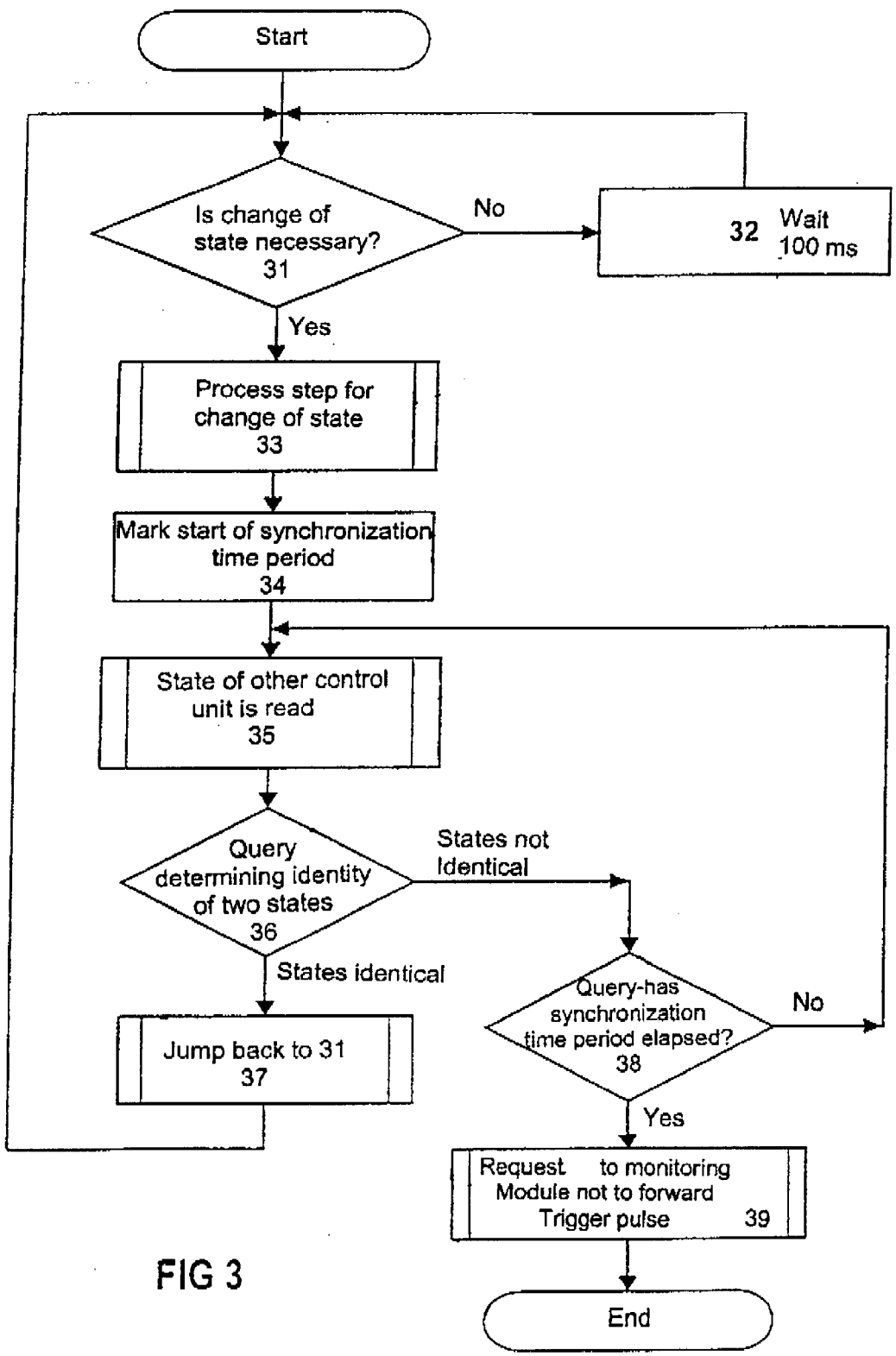
FIG. 3 is a flow diagram of a processing sequence in a comparison module.

FIG. 3 shows a process sequence in the comparison module in a control unit with a synchronization time of 100 ms. A start of the process sequence is marked by reference symbol S. A first process step 31 ascertains whether or not a change of state is necessary. If this is not the case (−), a process step 32 waits for 100 ms before the query 31 is started again. A new state is sent to the comparison module in another control unit in a process step 33 for a change of state (+). In a following process step 34, a start of a synchronization time period is marked and the state of the other control unit is then read in a process step 35. The identity of the two states is ascertained in a query 36. If the two states are identical (+), a process step 37 causes the process to jump back to the query 31. If the states are not identical (−), then a query 38 checks whether or not the synchronization time period has elapsed. If this is not the case (−), then the next occurrence is that the state of the other control unit is read in again in the process step 35. However, if the synchronization time period has elapsed (+), a request is sent to the monitoring module at a process step 39 not to forward the trigger pulse, and the process is ended as indicated by reference symbol E.

Figure 4:
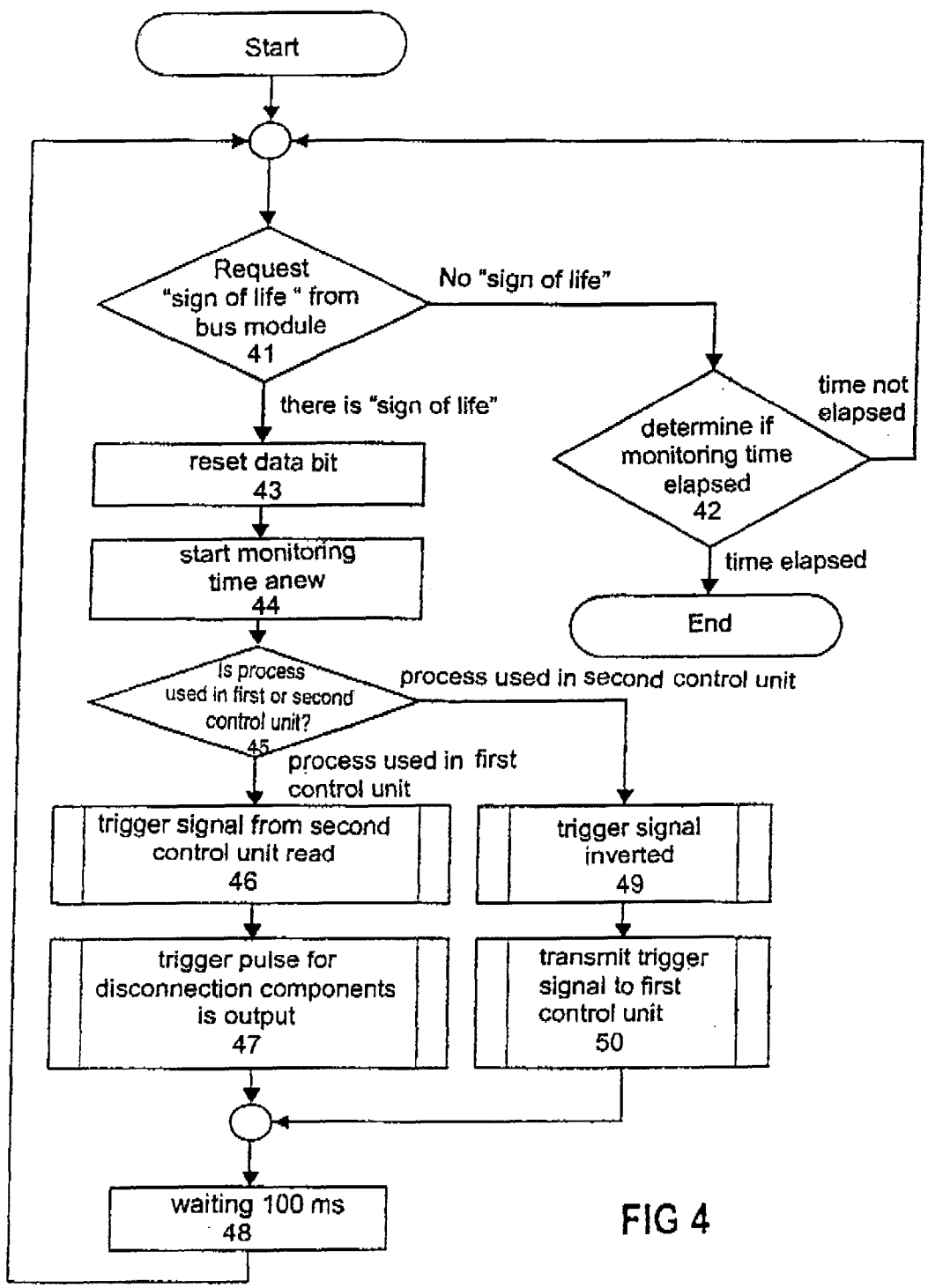
FIG. 4 is a flow diagram of a processing sequence in a monitoring module.

FIG. 4 shows a processing sequence in the monitoring module. A start of the processing sequence is marked by reference symbol S. In a first process step 41, a "sign of life" from a bus module is requested. If there is no "sign of life" (−), a check is then carried out in a process step 42 to determine whether or not the monitoring time has elapsed. If it has elapsed (+), the process is ended as indicated by reference symbol E and no further trigger pulses are sent to a disconnection component. If the time has not yet elapsed (−), the "sign of life" is requested again in the process step 41. If there is a "sign of life" (+) ("CAN bus flag set"), the appropriate data bit is then reset in a process step 43 and the monitoring time is started anew in a process step 44.

A following process step 45 asks whether or not the process is used in the first or in the second control unit. This query is inserted so that the program can be used in both control units. If the process is used in the first control unit (+), the trigger signal from the second control unit is read in a process step 46 and a trigger pulse for the disconnection components is then output in a process step 47. After a waiting time of 100 ms, for example, in a process step 48, the process starts again with the process step 41. However, if the process is used in the second control unit (−), a trigger signal is inverted ("toggled") in a process step 49 and is then transmitted to the first control unit in a process step 50. After a waiting time of 500 ms, for example, in the process step 48, the process starts again with the process step 41.

I claim:

1. A method for monitoring a controller, comprising:
   processing input signals from peripheral elements identically in first and second control units;
   determining output signals in parallel for the peripheral elements, in the first and second control units;
   comparing states of the first control unit and states of the second control unit;
   sending a trigger signal to a disconnection component only upon identity between the states;
   sending the trigger signal from the second control unit to the first control unit if the identity between the states has been established in the second control unit;
   maintaining sequence functions of the controller only if the disconnection component is triggered regularly.

2. A method for monitoring a controller, comprising:
   processing input Bignals from peripheral elements identically in first and second control units;
   determining output signals in parallel for the peripheral elements, in the first and second control units;
   comparing states of the first control unit and states of the second control unit;
   sending a trigger signal to a disconnection component only upon identity between the states;
   sending the trigger signal from the second control unit to the first control unit if the identity between the states has been established in the second control unit; and
   maintaining sequence functions of the controller only if the disconnection component is triggered regularly.

3. The method according to claim 2, which further comprises causing the first control unit and the second control unit to each determine their own state changes and transmit their own state for state comparison in the other control unit.

4. The method according to claim 2, which further comprises sending identical signals from the peripheral elements to the control units.

5. The method according to claim 4, which further comprises sending output signals to the peripheral elements only with the first control unit.

6. The method according to claim 4, which further comprises transmitting the signals through a fieldbus.

7. The method according to claim 6, which further comprises initially sending the trigger signal to a bus module and forwarding the trigger signal from the bus module to the disconnection component.

8. The method according to claim 7, which further comprises monitoring the bus module with one of the control units by triggering the disconnection component only if an output signal from the bus module is present.

9. The method according to claim 4, which further comprises transmitting the signals through a CAN bus.

10. The method according to claim 2, which further comprises providing another disconnection component and sending the trigger signal to both of the disconnection components.

11. The method according to claim 10, which further comprises providing two bus modules, initially sending the trigger signal to the two bus modules, forwarding the trigger signal from one of the bus modules to one of the disconnection components, and forwarding the trigger signal from another of the bus modules to another of the disconnection components.

12. The method according to claim 2, which further comprises monitoring a voltage of a power supply for the system with one of the control units.

* * * * *